(12) United States Patent
Hayes (10) Patent No.: US 10,921,980 B2
(45) Date of Patent: Feb. 16, 2021

(54) FLICK TO SEND OR DISPLAY CONTENT (71) Applicant: TiVo Solutions Inc., San Jose, CA (US)

(72) Inventor: Robin Hayes, Castro Valley, CA (US)

(73) Assignee: TiVo Solutions Inc., San Jose, CA (US)

( * ) Notice: Subject to any disclaimer, the term of this patent is extended or adjusted under 35 U.S.C. 154(b) by 0 days.

(21) Appl. No.: 16/890,633

(22) Filed: Jun. 2, 2020

(65) Prior Publication Data

US 2020/0301576 A1  Sep. 24, 2020

Related U.S. Application Data

(63) Continuation of application No. 16/383,113, filed on Apr. 12, 2019, now Pat. No. 10,705,727, which is a continuation of application No. 12/950,857, filed on Nov. 19, 2010, now Pat. No. 10,303,357.

(51) Int. Cl.
| | |
|---|---|
| G06F 3/0488 | (2013.01) |
| H04W 4/21 | (2018.01) |
| H04W 4/50 | (2018.01) |
| H04N 21/414 | (2011.01) |
| H04N 21/4786 | (2011.01) |
| H04N 21/4788 | (2011.01) |
| H04L 29/08 | (2006.01) |

(52) U.S. Cl.
CPC ........ *G06F 3/04883* (2013.01); *G06F 3/0488* (2013.01); *H04L 67/04* (2013.01); *H04L 67/1095* (2013.01); *H04N 21/41407* (2013.01); *H04N 21/4786* (2013.01); *H04N 21/4788* (2013.01); *H04W 4/21* (2018.02); *H04W 4/50* (2018.02); *G06F 2203/0383* (2013.01)

(58) Field of Classification Search
CPC .................................................. G06F 3/04883
See application file for complete search history.

(56) References Cited

U.S. PATENT DOCUMENTS

| | | | | |
|---|---|---|---|---|
| 2007/0146347 A1* | 6/2007 | Rosenberg | ............ | G08C 17/02 345/173 |
| 2009/0244015 A1* | 10/2009 | Sengupta | ................ | H04W 4/21 345/173 |
| 2010/0149096 A1* | 6/2010 | Migos | ................. | G06F 3/04883 345/158 |
| 2010/0156812 A1* | 6/2010 | Stallings | ............. | H04M 1/7253 345/173 |

\* cited by examiner

*Primary Examiner* — Roland J Casillas
(74) *Attorney, Agent, or Firm* — Haley Guiliano LLP (57) ABSTRACT

In an embodiment, a flick motion is detected on a touch screen interface of a first device. In response to detecting the flick motion: data associated with the flick motion is identified and transmitted to a second device. The data may be automatically displayed in response to detecting the flick motion.

18 Claims, 10 Drawing Sheets

| Header Information 390 | Flicked Content 392 | Metadata 394 |

FLICK TO SEND OR DISPLAY CONTENT

CROSS-REFERENCE TO RELATED APPLICATION

This application is a continuation of U.S. patent application Ser. No. 16/383,113, filed Apr. 12, 2019, which is a continuation of U.S. patent application Ser. No. 12/950,857, filed Nov. 19, 2010, now U.S. Pat. No. 10,303,357, which are hereby incorporated by reference herein in their entireties.

FIELD OF THE INVENTION

The present invention relates to the use of a flick motion.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data may be shared by users by direct communication between two user systems. For example, a user may compose an email, attach a file, and send the file to another user. In another example, a user may upload data to a server from a user's system and another user may download the data from the server to the user's system.

Data may also be shared by physically connecting a single user's device to a display screen and displaying the data from the user's device on the display screen.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Example features are described according to the following outline:

1.0 OVERVIEW
    2.0 SYSTEM ARCHITECTURE
    3.0 DETECTING A FLICK MOTION
    4.0 TRANSMITTING CONTENT IN RESPONSE TO DETECTING A FLICK MOTION
    5.0 DISPLAYING CONTENT IN RESPONSE TO DETECTING A FLICK MOTION
    6.0 EXAMPLE EMBODIMENTS
    7.0 HARDWARE OVERVIEW
    8.0 EXTENSIONS AND ALTERNATIVES

1.0 OVERVIEW

In an embodiment, a flick motion selecting content is detected on a touch screen interface of a device. In response to detecting the flick motion, the device may send the flicked content or associated content may be identified and transmitted to a second device.

In an embodiment, content selected by a flick motion and transmitted to another device may be automatically displayed. In a group setting many users may flick content to a shared resource where the flicked content may be queued for display or displayed upon receipt.

In an embodiment, detecting a flick may also include detecting specific directions, speeds, acceleration, etc. of the flick which may then be matched to corresponding commands. For example, direction may be used to select a particular recipient(s) of the flicked content.

Although specific components are recited herein as performing the method steps, in other embodiments agents or mechanisms acting on behalf of the specified components may perform the method steps. Further, although some aspects of the invention are discussed with respect to components on a system, the invention may be implemented with components distributed over multiple systems. Embodiments of the invention also include any system that includes the means for performing the method steps described herein. Embodiments of the invention also include a computer readable medium with instructions, which when executed, cause the method steps described herein to be performed.

2.0 SYSTEM ARCHITECTURE

Although a specific computer architecture is described herein, other embodiments of the invention are applicable to any architecture that can be used to perform the functions described herein.

Figure 1:
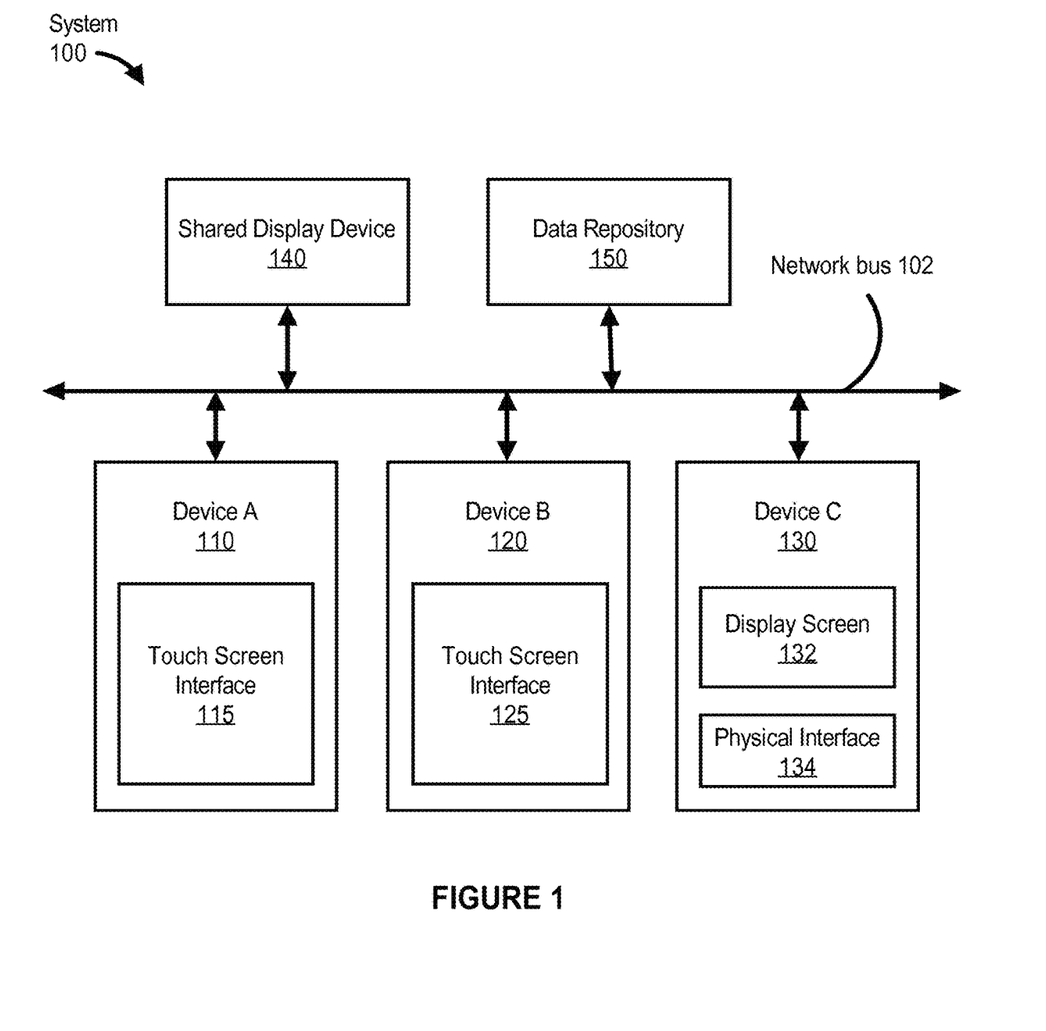
FIG. 1 is a block diagram illustrating an example system in accordance with one or more embodiments.

FIG. 1 is a block diagram illustrating an example system (100) in accordance with one or more embodiments. The example system (100) includes one or more components that function as content sources, user interface devices, display devices, and/or content management devices. Specific components are presented to clarify the functionalities described herein and may not be necessary to implement one or more embodiments. Each of these components are presented to clarify the functionalities described herein and may not be necessary to implement one or more embodiments. Furthermore, components not shown in FIG. 1 may also be used to perform the functionalities described herein. Functionalities described as performed by one component may instead be performed by another component. A network bus (102) connecting all components within the system (100) is shown for clarity. The network bus (102) may represent any local network, intranet, internet, etc. The network bus (102) may include wired and/or wireless segments. All components (shown as communicatively coupled) may not necessarily be communicatively coupled to all other components within the system (100). An example system (100) may include one or more of: device A (110), device B (120), device C (130), shared display device (140), and server (150).

In an embodiment, the one or more features or functionalities as described herein may be implemented by a software application. The software application may be pre-loaded on any device or downloaded and installed on a device. The software application may be configured to function as an add-on to another application or execute concurrently with another application. For example, the software application may be an input tool which detects flicks selecting content displayed by another application.

In an embodiment, device A (110) generally represents any device which may be configured for detecting a flick motion as user input. A user (includes any operator of device A (110)) may perform a flick motion detected by device A (110) by touching a particular spot on the touch screen interface (115) of device A (110) with a finger (or any other item, e.g., a stylus), and sliding the finger away from the particular spot while maintaining contact with the touch screen interface (115) for a portion of the sliding action performed by the user and continuing the sliding action even after contact with the touch screen interface (115) has ended. Touching or making contact as referred to herein may include hovering over a touch screen interface (115) such that the touch screen interface (115) detects the hovering. In a first example, the user may release contact with the touch screen interface (115) while still moving the finger in the direction of the sliding action even though additional surface area of the touch screen interface (115), in the direction of the sliding action, may be available to continue the sliding action while maintaining contact. In another example, a flick action may involve a user touching a particular spot on the touch screen interface (115) of device A (110) and then sliding the finger, while maintaining contact with the touch screen interface (115), beyond the edge of the touch screen interface (115). Accordingly, the user may maintain contact with the touch screen interface (115) (e.g., with a finger) until the finger reaches the edge of the touch screen interface (115) and continue a motion in the same direction past the edge of the touch screen interface (115).

In an embodiment, an operator may use a flick motion to select content or data. A visual representation of any data or content, from where the flick motion is initiated may be selected by the flick motion. For example, an operator may select a video using a flick motion by first touching a thumbnail or file name of the video and then sliding a finger away from the initial contact point. Content or data selected by a flick motion may be referred to herein as flicked content.

In an embodiment, device A (110) may include a touch screen interface (115) configured to detect the flick motion described above. Device A (110) may be configured to detect a flick motion, a speed of a flick motion, a direction of a flick motion, or a direction of the flick motion with respect to items displayed on the touch screen interface (115) (e.g., flick motion toward a particular icon or other visual representation of content, user, device, etc.). Detecting a flick motion, as referred to herein, means detecting the portion of the sliding action by a user's finger (or other item) in which contact between the finger and the touch screen interface (115) is maintained. A flick motion may be distinguished from another sliding action by device A (110) based on, for example, the release of the contact between the finger and the touch screen interface (115). Since a user performing a flick motion continues the sliding action after releasing contact with the touch screen interface (115), there is no continuous maintained contact at a single position on the touch screen interface (115) before contact between a finger and the touch screen interface (115) is released. Based on this information, device A (110) detects that contact between a finger and the touch screen interface (115) was released as the finger was still sliding.

In one example, device A (110) may include a resistive system where an electrical current runs through two layers which make contact at spots on the touch screen interface (115) that are touched. The coordinates of the contact points or contact spots are matched with an image being displayed to determine what portion of the image is being touched by the user. In another example, device A (110) may include a capacitive system with a layer that stores electrical charge, a part of which is transferred to a user where the user touches the touch screen interface (115). In another example, device A (110) may include a surface acoustic wave system with two transducers with an electrical signal being sent from one transducer to another transducer. Any interruption of the electrical signal (e.g., due to a user touch) may be used to detect a contact point on the touch screen interface (115). For example, device A (110) may be configured to first detect that an initial user touch on a visual representation, of the data, displayed on the touch screen interface.

In an embodiment, device A (110) may include hardware configured for receiving data, transmitting data, or otherwise communicating with other devices in the system (100). For example, device A (110) may include functionality to transmit any content selected by a flick motion in response to detecting the flick motion. Content selected by a flick motion may be referred to herein as flicked content or content being flicked. In another example, device A (110) may include functionality to transmit information (may be referred to herein and used interchangeably with metadata) associated with the flicked content (in addition to the flicked content or instead of the flicked content) in response to detecting the flick motion. In an embodiment, device A (110) may include functionality to transmit any flicked content for display by another device. For example, device A (110) may transmit flicked content to a television set for display on the television set.

In an embodiment, device A (110) may include one or more of: Read Only Memory (ROM) (206), a Central Processing Unit (CPU), Random Access Memory (RAM), Infrared Control Unit (ICU), a key pad scan, a key pad, Non-Volatile Memory (NVM), one or more microphones, a general purpose input/output (GPIO) interface, a speaker/tweeter, a key transmitter/indicator, a microphone, a radio, an Infrared (IR) blaster, a network card, a display screen, a Radio Frequency (RF) Antenna, a QWERTY keyboard, a network card, network adapter, network interface controller (NIC), network interface card, Local Area Network adapter, Ethernet network card, and/or any other component that can receive information over a network. In an embodiment, device A (110) may be configured to communicate with one or more devices through wired and/or wireless segments. For example, the device A (110) may communicate wirelessly over one or more of: radio waves (e.g., Wi-Fi signal, Bluetooth signal), infrared waves, over any other suitable frequency in the electro-magnetic spectrum, over a network connection (e.g., intranet, internet, world wide web, etc.), or through any other suitable method.

In an embodiment, device B (120) with touch screen interface (125) and device C (130) with display screen (132) and physical interface (134) represent other example devices that may be used concurrently within the system (100). Device B (120) and device C (130) may or may not include similar components as device A (110). For example, device C (130) may include a display screen (132) for displaying output and a separate physical interface (134) (e.g., physical buttons) for receiving input instead of a touch screen interface (115) as included in device A (110). Device B (120) and device C (130) may include some similar functionality as device A (110). Device B (120) may be configured to transmit data for storage or display in response to detecting a flick motion. Device C (130) may be configured to transmit data for storage or display in receiving a user command through the physical interface (134).

In an embodiment, a shared display device (140) generally represents any display device which may include functionality to receive input from one or more sources (e.g., device A (110), device B (120), device C (130) and/or other sources (not shown)) via a direct connection (wired or wireless), or over a network (e.g., intranet, internet, etc.). Examples of the shared display device (140) may include but are not limited to computers, notebooks, liquid crystal displays, plasma displays, tablets, kiosks, mobile devices, cell phones, smart phones, e-book readers, televisions, or any other device which may display content. The shared display device (140) may display any type of data received from any source. The shared display device (140) may include functionality to receive, process, and/or manage the content received from multiple sources. The shared display device (140) may be managed by a designated management device (not shown). The shared display device (140) may be managed by one of the mobile devices (e.g., device A (110), device B (120), or device C (130)). For example, content displayed on the shared display device (140) may be managed by the device from which the shared display device (140) received the content, or from which the shared display device (140) received a reference to the content. The shared display device (140) may include functionality to receive content from multiple devices for display. For example, the shared display device (140) may include functionality to receive different content files from different content sources and queue all of the received content for display. The shared display device (140) may be configured to automatically display any received content. One or more embodiments may include non-shared display devices (not shown) used with or instead of the shared display device (140). For example, the system (100) may include display devices which accept content for display from a single content source at any given time. Device A (110), device B (120), and device C (130) may themselves be display devices that receive content, or references to content which can be obtained based on the references.

In an embodiment, the data repository (150) generally represents any data storage device or data storage component within a device. Examples of the data repository (150) include servers (e.g., local servers, web servers, etc.), peer to peer systems, back-up storage, discs, volatile memory, non-volatile memory, flash drives, kiosks, etc. In an embodiment, the data repository (150) may represent a collection of systems that can be searched. In an embodiment, the data repository (150) may be queried for content. For example, content that is selected at a first device using a flick motion may be obtained by a second device directly from the data repository (150) using references, to the content, received from the first device.

3.0 DETECTING A FLICK MOTION

Figure 2:
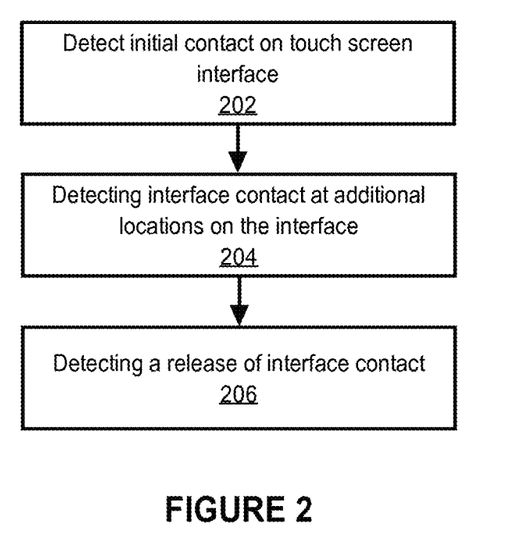
FIG. 2 illustrates a flow diagram for detecting a flick motion in accordance with one or more embodiments.

FIG. 2 illustrates a flow diagram for detecting a flick motion. One or more of the steps described below may be omitted, repeated, and/or performed in a different order. Accordingly, the specific arrangement of steps shown in FIG. 2 should not be construed as limiting the scope of the invention.

In one or more embodiments, detecting a flick motion may include detecting interface contact at an initial location on a touch screen interface (Step 202). The initial contact on the touch screen interface may be made with a user finger, a stylus, or any other item which may be used to perform a flick motion on a touch screen interface. The initial contact with the touch screen interface may involve a quick touch at the initial location or a touch that is maintained at the initial location for any period of time (e.g., a millisecond, a second, two seconds, etc.). The initial contact with the touch screen interface may be brief as it may be made by a finger already moving in a direction. For example, a finger moving in the air without making contact, and at some point during the moving making the initial contact with a portion of the touch screen interface and continuing in the direction while maintaining contact with the touch screen interface.

In an embodiment, the initial contact as referred to herein may include a finger (or other item) being close enough to a touch screen interface that the touch screen interface detects the finger. For example, when using a device including a capacitive system with a layer that stores electrical charge, a part of the electrical charge may be transferred to a user where the user touches the touch screen interface or where a user simply hovers close to the touch screen interface. Accordingly, initial contact or maintained contact as referred to herein may include a user hovering a finger or other item over a touch screen interface.

In an embodiment, the initial contact on the touch screen interface selects the content that is to be flicked. For example, the initial contact may select an icon displayed on the touch screen interface at a location on the touch screen interface corresponding to the initial contact. In another example, the initial contact may select a video that is being played on the touch screen interface. For example, the initial contact may select any portion of the touch screen interface on which the video is being played. In an embodiment, a list of files may be displayed and the initial contact may select text corresponding to a particular file.

In one or more embodiments, detecting a flick motion may further include detecting interface contact at additional locations, on the touch screen interface, in a chronological sequence away from the initial location (Step 204). For example, interface contact may be detected continuously along a path away from a location of the initial contact point on the touch screen interface. The contact along a path away from the location of the initial contact point may be referred to herein as a sliding motion. In one or more embodiments, a speed of the sliding motion or a direction of the sliding motion may be determined. For example, contact at two or more locations on the interface, such as the initial contact point and a second point along the path of the sliding motion, may be used to determine a direction and/or a speed of the sliding motion.

In one or more embodiments, detecting a flick motion includes detecting a loss of interface contact (e.g., when interface contact is no longer detected on the touch screen) while the sliding motion is still being performed by a user (Step 206). A period of time during which contact was made with the release location (the last contact point on the touch screen interface before contact was released) may be used to determine whether contact with the touch screen interface was released while a user was performing the sliding motion. For example, if the user maintained contact at the release location for a period of time that was equivalent to contact at other locations along the sliding motion, a determination may be made that contact with the touch screen interface was released while a user was still moving his finger. In an embodiment, a flick motion may refer to contact with the touch screen interface during which, after the sliding motion is initiated, there is no pause in the sliding motion until after contact with the touch screen interface has been released.

Figure 3A:
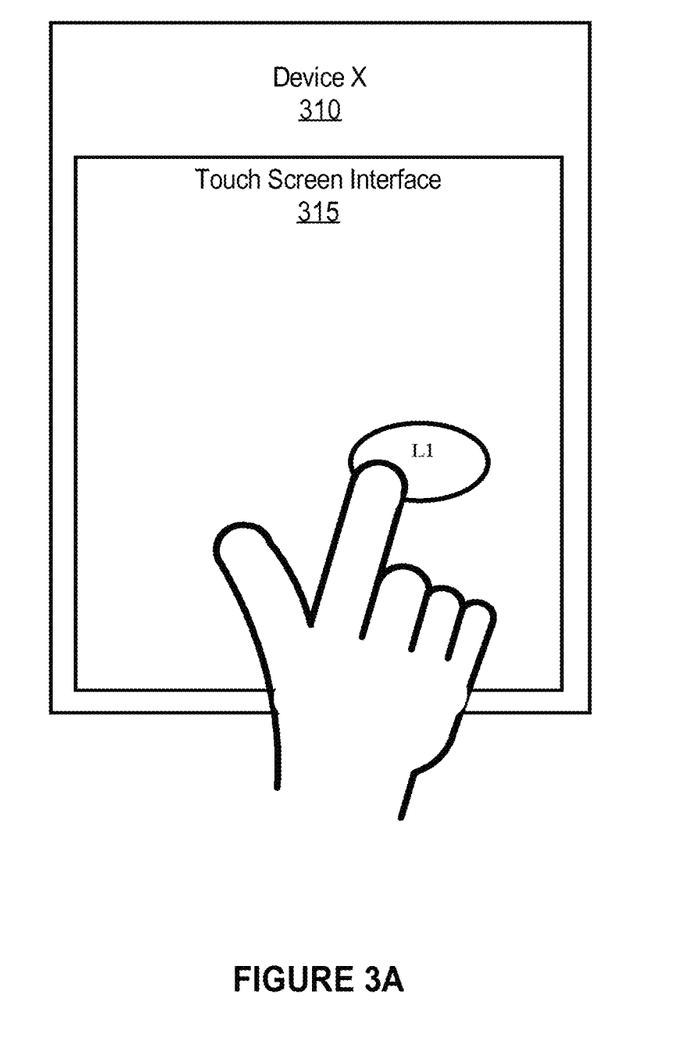
FIG. 3A, FIG. 3B, and FIG. 3C illustrate a flick motion in accordance with one or more embodiments.
Figure 3B:
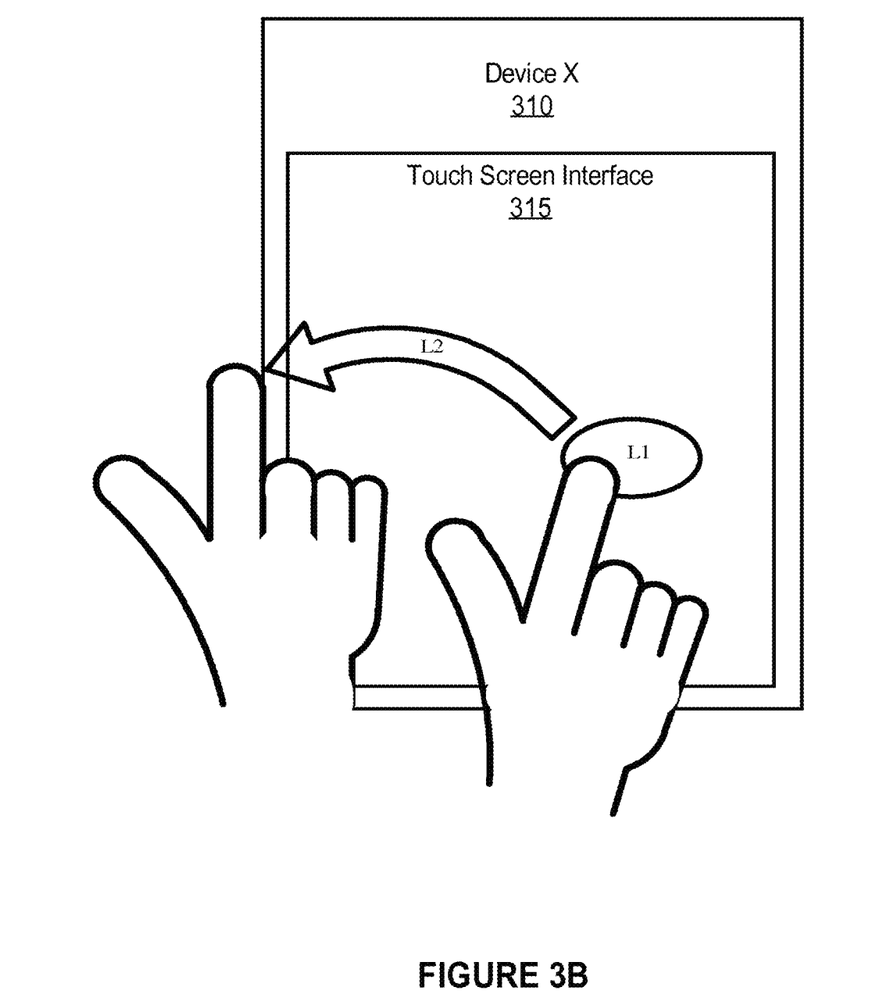

FIGS. 3A and 3B illustrate an example of a flick motion. As shown in FIG. 3A, a user first touches an initial location L1 on a touch screen interface (315) of device X (310). As shown in FIG. 3B, the user then slides the finger, while maintaining contact with the touch screen interface (315) toward location L2 on the touch screen interface (315). At location L2, the user continues moving the finger in a similar or identical direction, however, releases contact with the touch screen interface (315) at location L2. Accordingly, the user makes contact with the touch screen interface (315) at location L1 and maintains contact with the touch screen interface (315) until location L2 is reached, at which point, the user releases contact with the touch screen interface (315).

Figure 3C:
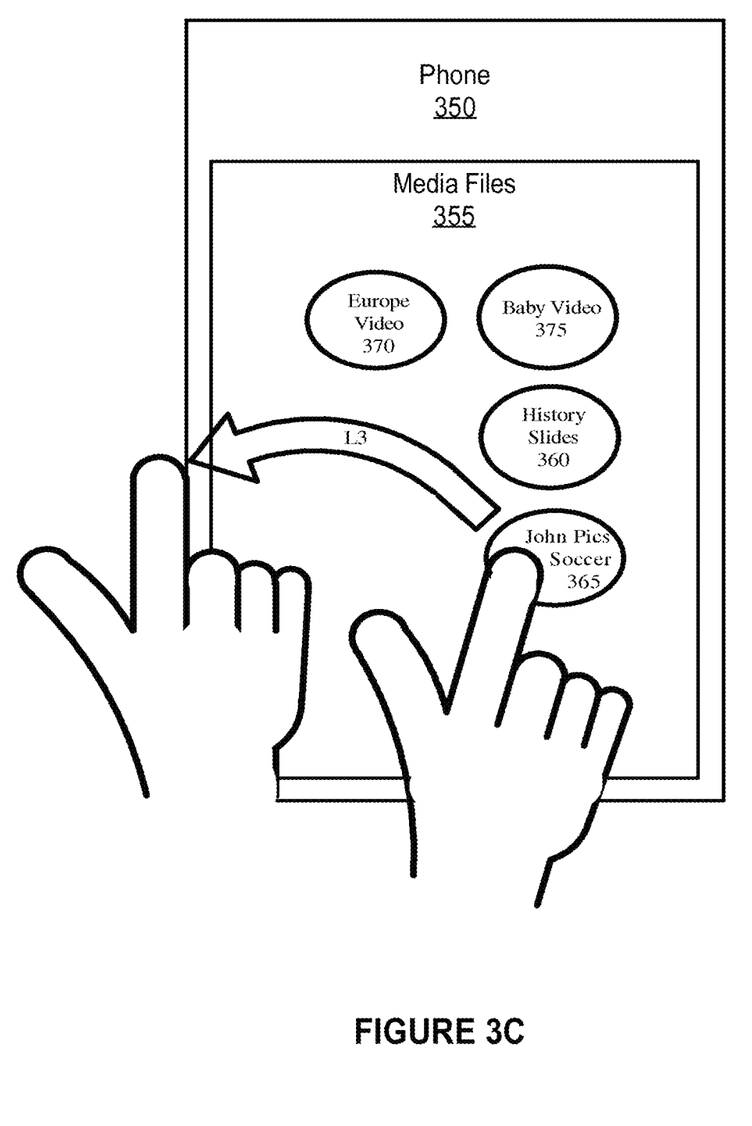

FIG. 3C illustrates an example of a user selecting an item from a menu and flicking the item to send the item to another device. FIG. 3C includes a phone 350 displaying media files 355 on a touch screen interface. The media files include "Europe Video 370", "Baby Video 375", "History Slides 360", and "John Pics Soccer 365". Of the available choices, a user hovers a finger over John Pics Soccer 365 until the phone 350 shows a visual indication of selection. For example, the phone may indicate selection by highlighting the icon John Pics Soccer 365 or displaying concentric circles around the icon John Pics Soccer 365. Once John Pics Soccer 365 is selected, the user flicks the content by moving toward location L3 and lifting the finger away from the phone 350 while moving toward location L3.

4.0 TRANSMITTING CONTENT IN RESPONSE TO DETECTING A FLICK MOTION

In one or more embodiments, content selected by a flicked motion (e.g., flicked content) on a first device is transmitted to a second device. The flicked content may be transmitted immediately in response to detecting the flick motion. Transmitting flicked content may include sending a file comprising the flicked content to one or more other devices using a direct wired or wireless connection with a receiving device or sending the file including the flicked content over a network through intermediate devices. For example, flicked content may be sent to another device over a Bluetooth connection or another device over a network using an internet or an intranet connection. Sending flicked content, as referred to herein, may include sending a reference to the flicked content. For example, a sending device may send a reference to the flicked content to a receiving device, which may then obtain the flicked content (e.g., from a data repository). In an embodiment any type of metadata may be sent with the flicked content or instead of the flicked content in response to detecting a flick. For example, a preview file or a link to preview the flicked content may be sent. When a video is flicked, particular frames may be selected from the video and sent instead of sending the entire video. In response, the recipient may then request the entire video or otherwise access the entire video.

Figure 3D:
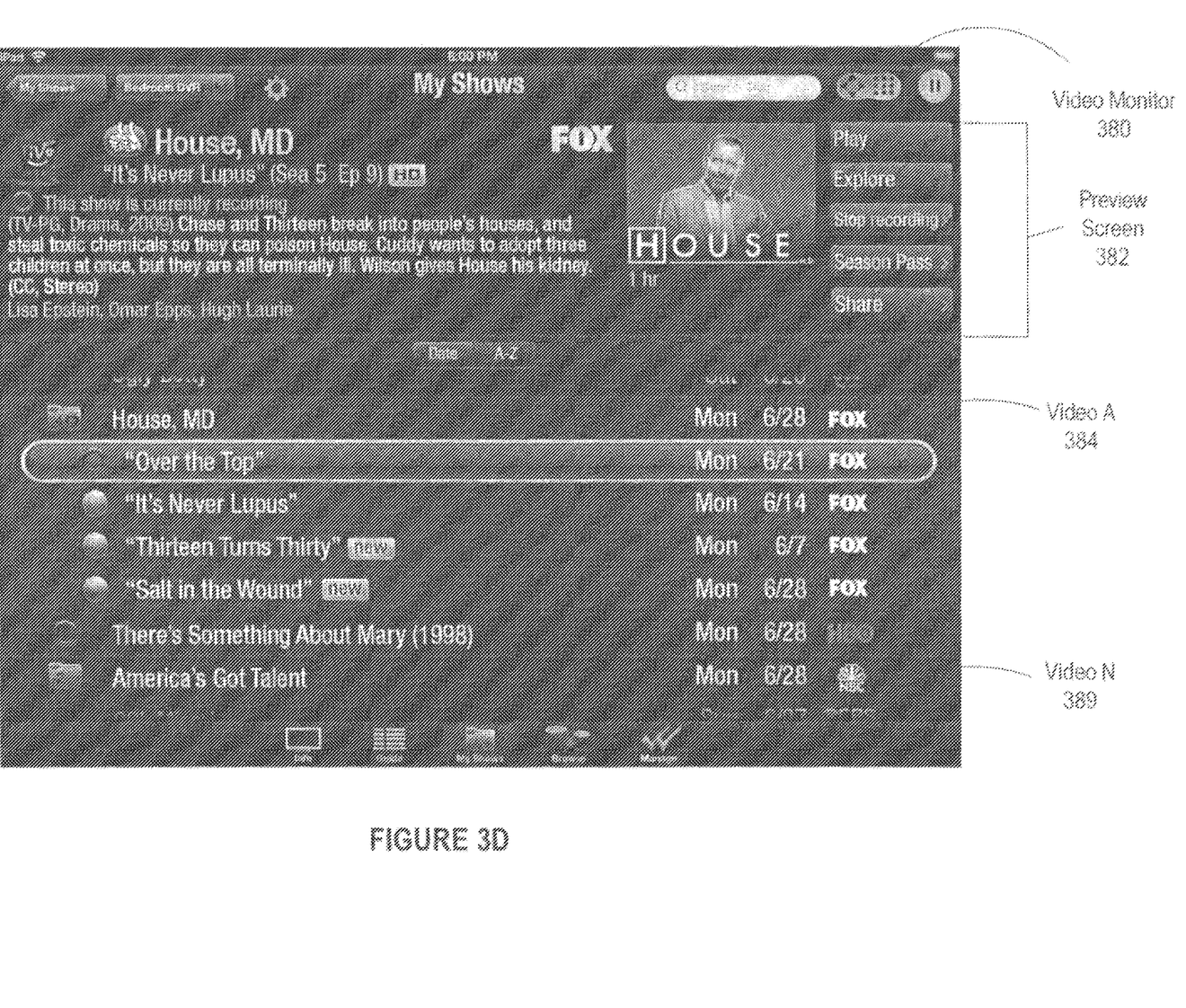
FIG. 3D illustrates an example screen shot in accordance with one or more embodiments.

FIG. 3D illustrates an example screen shot displaying a selectable set of videos (e.g., video A (384) to video N (389)) and a preview screen (382) displayed on a video monitor (380). A device may detect the selection of a video (e.g., video A (384) to video N (389)) and display information about the selected video in preview screen (382). This information may include text, a trailer, screen shots, etc. A user may then select a particular video by performing a flick motion initiated on the preview screen (382). For example, a user may select a thumbnail representing a video or a thumbnail representing a frame from the video. The video monitor may detect the flick and determine the video from video A (384) to video N (389) that was being previewed and send the video that was being previewed to a destination device.

In an example, the video monitor (380) may be a component of a tablet displaying the preview screen (382). The tablet may generate a display based on information indicating available content (e.g., video A (384) and video N (389)). The information indicating the available content may be received from a set-top box, a video recorder, a server, a media management device, or any other device. In an embodiment, the tablet may receive the display screen from the video recorder. The video recorder may generate a screen shot of available content based on content stored on the video recorder or content accessible (e.g., over a network) by the video recorder. In another example, the video recorder may obtain the screen shot of available content from a server.

Figure 3E:
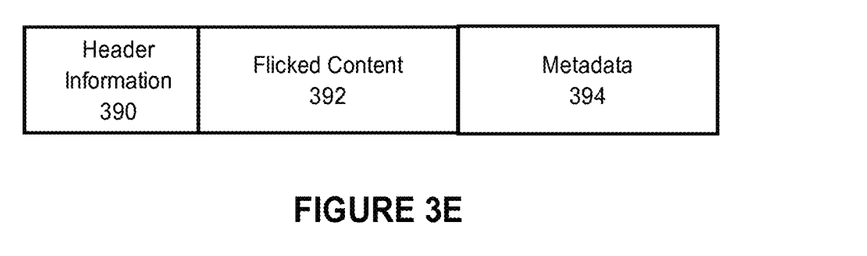
FIG. 3E illustrates an example packet in accordance with one or more embodiments.

FIG. 3E illustrates an example of one or more packets that are sent from a first device which detects a flick to a receiving device. The packet may include header information (390) about the packet, flicked content (392), and metadata (394). In an embodiment, flicked content and metadata associated with the flicked content may be sent in separate packets.

In an embodiment, one or more devices may be selected for receiving flicked content before the flick motion is initiated. For example, a user may select one or more contacts from a phonebook for flicking content. A user may create a group on a social networking website which includes all the recipients of flicked content for that user. The devices associated with the identified recipients may then receive the flicked content. In another example, other users may subscribe to a particular user's flicked content. Accordingly, all content flicked by the particular user may be sent to all subscribing users. Any other methods of creating groups of recipients may be used. Accordingly, the recipients of flicked content may be selected by the person flicking the content or may be selected by a system (e.g., using groups etc.). For example, regardless of the direction in which the content is flicked, the receiving device for the flicked content may be selected before the flick motion is performed.

In an embodiment, one or more devices may be selected for receiving flicked content by the flick motion itself. A direction in which the flick is performed may indicate the recipient of the flicked content. The direction may be determined by the initial contact location and a subsequent contact location on a touch screen interface of the device. For example, a device may be configured to transmit content to a particular receiving device Y if the content is flicked to the left. In another example, a device may be configured to transmit content to all devices within a particular group G if the content is flicked to the top right of the user interface screen. Any number of preset receiving devices or groups of receiving devices may be configured based on the direction of the flick.

In one or more embodiments, the direction of the flick may be combined with other factors to identify the receiving device. For example, in a room of devices, a receiving device of the flicked content, on a sending device, may be determined based on the physical location of the receiving device. Using any available technology (e.g., infrared, Bluetooth, 802.11x wireless, etc.), a location of all devices relative to the sending device may be identified (e.g., by triangulation using two or more different communications signals, signal strength, etc.). Thereafter, a particular direction of the flick on the touch screen interface may be matched with one or more devices in that particular direction from the sending device. A user interface may then be displayed on the touch screen that identifies devices in range and each device's relative position.

Figure 4:
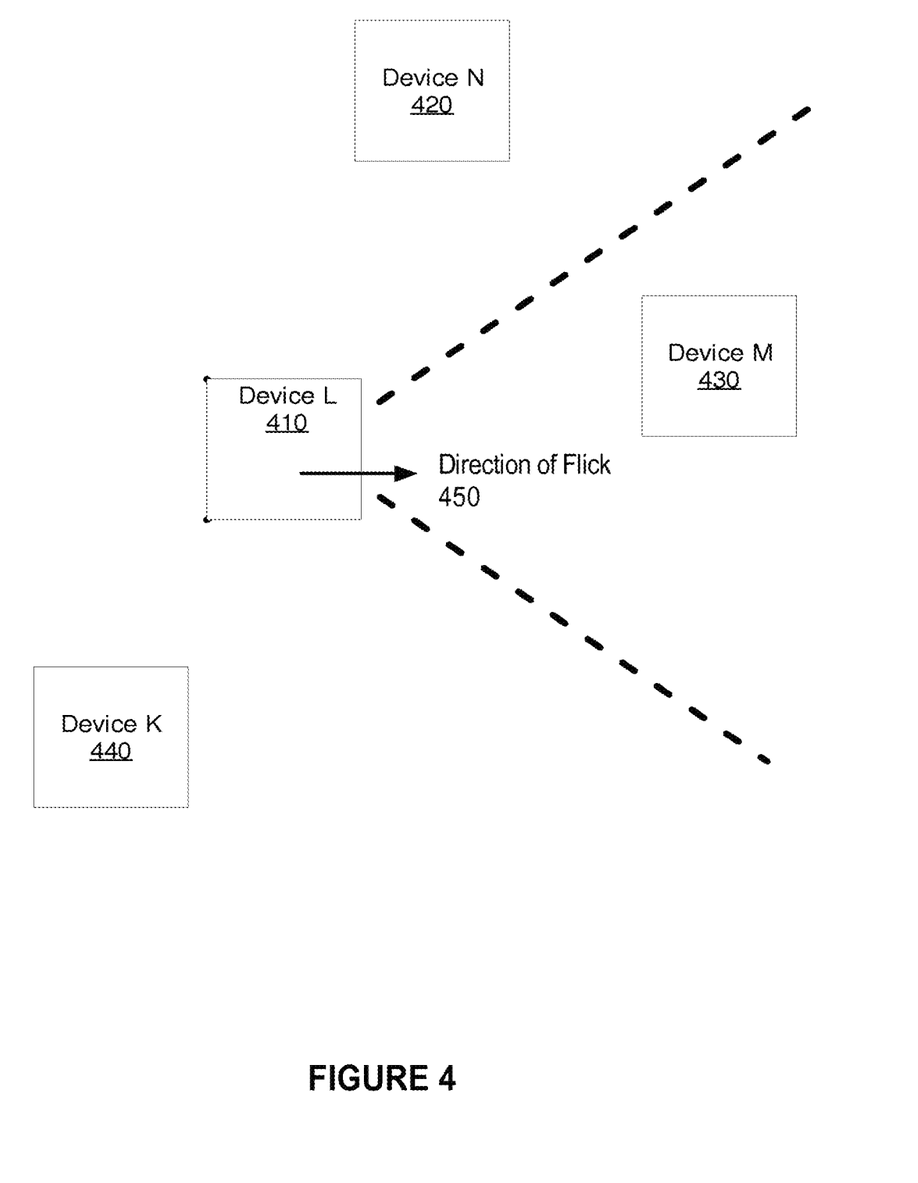
FIGS. 4 and 5 illustrate examples of direction-based selection of a receiving device in accordance with one or more embodiments.

FIG. 4 illustrates an example of a direction-based selection of a receiving device in accordance with one or more embodiments. If a sending device L (410) detects a flick motion with direction (450) to the right, the device(s) (e.g., device M (430)) in that direction may be identified as receiving devices, while other devices (e.g., device N (420) and device K (440)) may not be identified as receiving devices. An example range (indicated by dotted lines) using an angle in both directions from the direction of the flick is used to illustrate direction and devices within that direction. However, the devices may be configured using any mechanism or implementation for evaluating whether a particular device is within the direction of the flick motion.

If a single device is in the direction of the flick, that single device may be identified as the receiving device. The single device may be operated by another user or may simply be a display device (e.g., a liquid crystal display). If multiple devices are identified in the direction of the flick, the flicked content may be sent to all of the multiple devices or to one or more specific devices found in that direction. For example, a user may be prompted to select the device from an identified set of devices. In another example, the device that is comes closest to an imaginary vector in the direction of the flick, from the sending device, may be selected.

Figure 5:
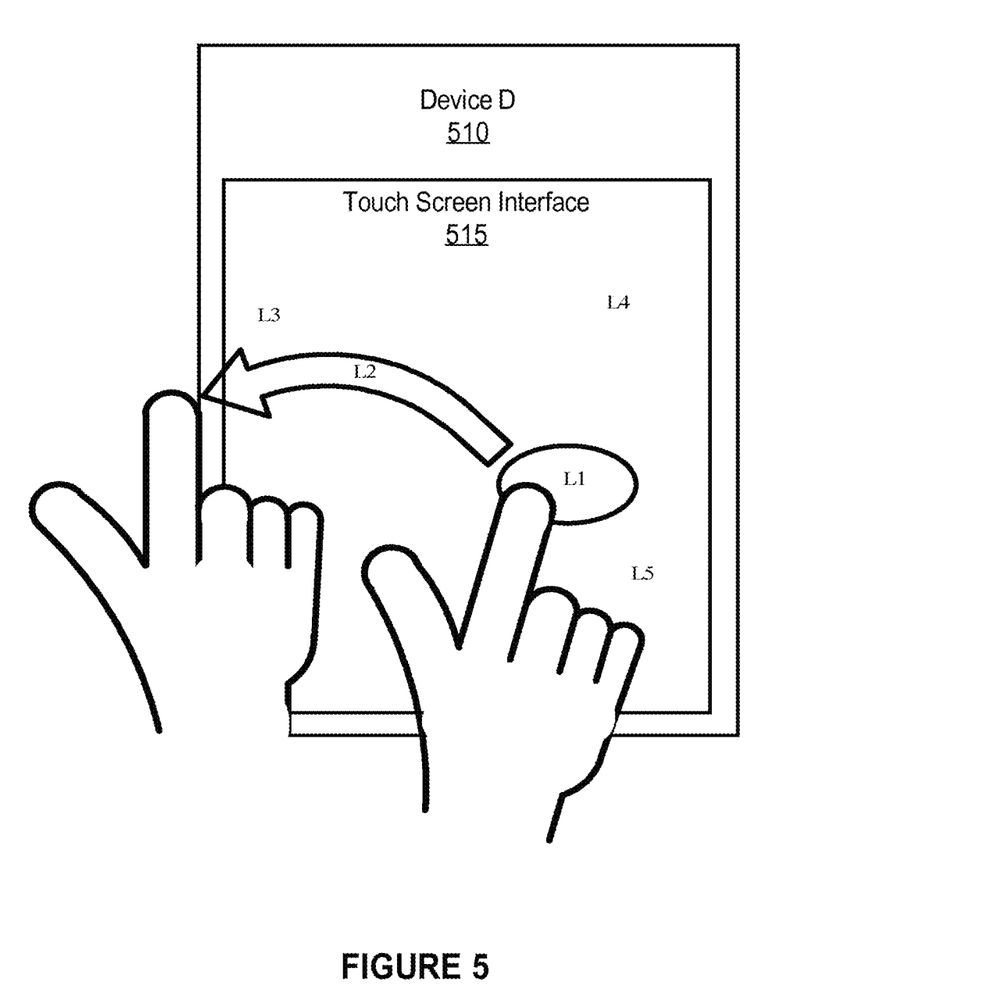

In an embodiment, the direction of the flick motion may be combined with representations of devices on the touch screen interface to select receiving devices. FIG. 5 illustrates another example of a direction-based selection of a receiving device in accordance with one or more embodiments. As illustrated in FIG. 5, a flick motion may be initiated at location L1 toward location L3 with a contact release point of L2. Accordingly, although a finger (or other item) performing the flick motion makes contact with the touch screen interface (515) on device D (510) from location L1 to location L2, the direction of the flick is in the direction of location L3. A device, represented by an icon displayed at location L3, may then be selected as the receiving device because the flick motion is in the direction of the icon. Devices represented by icons located at location L4 or location L5 may not be selected as recipients for the flicked content since they are not in the direction of the flick motion.

5.0 DISPLAYING CONTENT IN RESPONSE TO DETECTING A FLICK MOTION

In one or more embodiments, content may be displayed on a receiving device in response to detecting a selection of the content using a flick motion on a sending device. Content may be selected using a flick motion, as described above. Furthermore, content, or a reference to the content, may be sent to one or more receiving devices, as described above.

In one or more embodiments, flicked content may be automatically displayed by a receiving device. The flicked content may be displayed in response to a device detecting a flick motion that selects content and the device sending the flicked content with display instructions to one or more receiving devices. In an embodiment, the receiving device may be a television or other display device which is configured to display any received content.

In an embodiment, a received device may display flicked content starting with a particular start position specified by the sending device. For example, a user may flick a video being played on a cellular phone. The cellular phone may send the flicked content to a television and a playing position of the video or a frame that was displayed when the flick was detected. A television receiving the flicked content may then play the video by starting the playing of the video at the frame or playing position received from the cellular phone.

In one or more embodiments, direction of a flick or speed of a flick which selects content may be used to determine whether the content is to be sent and stored or whether the content is to be sent and displayed by a receiving device. For example, if a receiving device is selected in advance, a flick to the right may signify sending content for storing on the receiving device and a flick to the left may signify sending content for displaying on the receiving device. In an embodiment, a direction of the flick may be used to select the receiving device and select whether the content is sent for storage or display on the receiving device. For example, a flick motion toward the top right of a touch screen interface may signify a command for sending the content to a receiving device that is to the right of the sending device and storing the content at that receiving device. Further a flick motion toward the bottom right of the touch screen interface may signify a command for sending the content to the receiving device that is to the right of the sending device and displaying the content at that receiving device.

In one or more embodiments, flicked content sent to a particular receiving device may be displayed in an order in which the content was received. For example, multiple users each operating a respective device may flick content to a shared resource such as a television. The television (or a management device) may then display the content in the order in which it was received.

In one or more embodiments, a receiving device may display content according to a priority scheme. For example, flicked content from devices associated with high priority users may be displayed first. In another example, one or more users may be able to manage the display queue of content received by the receiving device. The user may change the order of items within the display queue, remove items from the display queue, or add items to the display queue.

In one or more embodiments, each time a receiving device receives flicked content, the receiving device stops playing any other content if the receiving device is playing other content, and displays the received flicked content. Accordingly, each time a user flicks content to the display device, the display device immediately plays that flicked content (e.g., by discarding previously flicked content).

In an embodiment, a display screen on a shared display device is split up into different sections. For example, the display screen may include two or four sections, where each section displays content flicked to the display screen by a particular device. If four users, each with a device, flick content to a shared display screen with four sections, each user may have their own section for displaying content that is flicked by that user. In turn, each user has control over the playback of the content played in that section (e.g., using trickplay functions—fast-forward, pause, reverse, play, frame step, etc.). In one example, a user on a cellular phone viewing a video streamed online may select the video with a flick. The cellular phone may then send a link to the video to a television (or device in communication with the television). The television through a connected network card may download the video and play the video. The user may then control the playback of the video being played on television with the cellular phone. The system may, by default, provide playback control from the source of the video (the cellular phone in this example). Furthermore, the user may transfer playback control to another device (e.g. a tablet) within the same room. The user may also transfer playback control to a simple remote control configured to communicate with the television.

In one or more embodiments, a sending device may be used by an operator to create playlists of different content files or establish a particular sequence in which different content is to be played. The playlist or sequence of content may then be flicked (or sent in another manner) to a receiving device (e.g., a shared display device) for display.

In an embodiment, the sending device which detected the flicked content and sent the flicked content (or a reference to the flicked content), may then control the display of the flicked content on the receiving device. For example, when a user uses a flick motion, on a particular sending device, to select a link to an online video, the display device may obtain the video (directly from the sending device or from another device) and display the video. The controls (e.g., pause, stop, play, forward, rewind, etc.) for that video may then be operated by that particular sending device. The controls for operating the shared display device may change dynamically depending on the source of the content being displayed on the shared display device. The device which provided the content to the shared display device may control the displayed content. In an embodiment, the device which provided the content to the shared display device may transfer control to another device. In an embodiment, all devices communicatively coupled to the shared display device may be configured to control the display of content on the shared display device.

6.0 EXAMPLE EMBODIMENTS

In an embodiment, a flick motion is detected on a touch screen interface of a first device. In response to detecting the flick motion: data associated with the flick motion is identified and transmitted to a second device.

In an embodiment, the second device may be selected from a plurality of devices based on a direction of the flick motion. For example, detecting the second device may be based on detecting that the flick motion was in a direction of a visual representation of the second device, on the touch screen interface, where the user performing the flick motion does not touch the visual representation of the second device on the touch screen.

In an embodiment, the second device, which received the flicked content, may store, display, or perform another function based on the direction of the flick motion used for selecting the flicked content. In an embodiment, sending the flicked content involves sending a reference to the flicked content whereby the receiving device may obtain the flicked content based on the reference to the flicked content.

In an embodiment, detecting the flick motion may include detecting an initial user touch on a visual representation of the data, displayed on the touch screen interface; detecting a movement of the user touch along the touch screen interface away from a location of the initial user touch; while the movement is being detected, detecting a release of the user touch.

In an embodiment, a first device which sends the flicked content to a second device controls one or more playback operations for displaying the content on the second device.

In one or more embodiments, a set of receiving devices for the flicked content are based on an associated set of users. The set of users may be selected from a larger group of users and the flicked content may be sent to the set of receiving devices associated with the set of users. The set of users may be selected by a user of the sending device. The set of receiving devices for the flicked content may be selected based on detection by the sending device within the same sub-network.

In one or more embodiments, a method includes detecting a first flick motion on a first touch screen interface of a first device; in response to detecting the first flick motion, causing display of at least a portion of first content associated with the first flick motion on a shared display device; subsequent to detecting a first flick motion, detecting a second flick motion on a second touch screen interface of a second device; in response to detecting the second flick motion, causing display of second content, associated with the second flick motion, on the shared display device, the display of the second content being subsequent to the display of at least the portion of the first content.

The method may further include for each content of a plurality of content, queuing that content for display on a shared display device at a position, in a queue, that is based on a time corresponding to detection of a flick motion associated with that content.

The method may further include for each content in a plurality of content, queuing that content for display on a shared display device in response to detecting a flick motion associated with that content, that content being queued at a queue position based on a priority level associated with that content.

Although specific components are recited herein as performing the method steps, in other embodiments agents or mechanisms acting on behalf of the specified components may perform the method steps. Further, although some aspects of the invention are discussed with respect to components on a system, the invention may be implemented with components distributed over multiple systems. Embodiments of the invention also include any system that includes the means for performing the method steps described herein. Embodiments of the invention also include a computer readable medium with instructions, which when executed, cause the method steps described herein to be performed.

7.0 HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
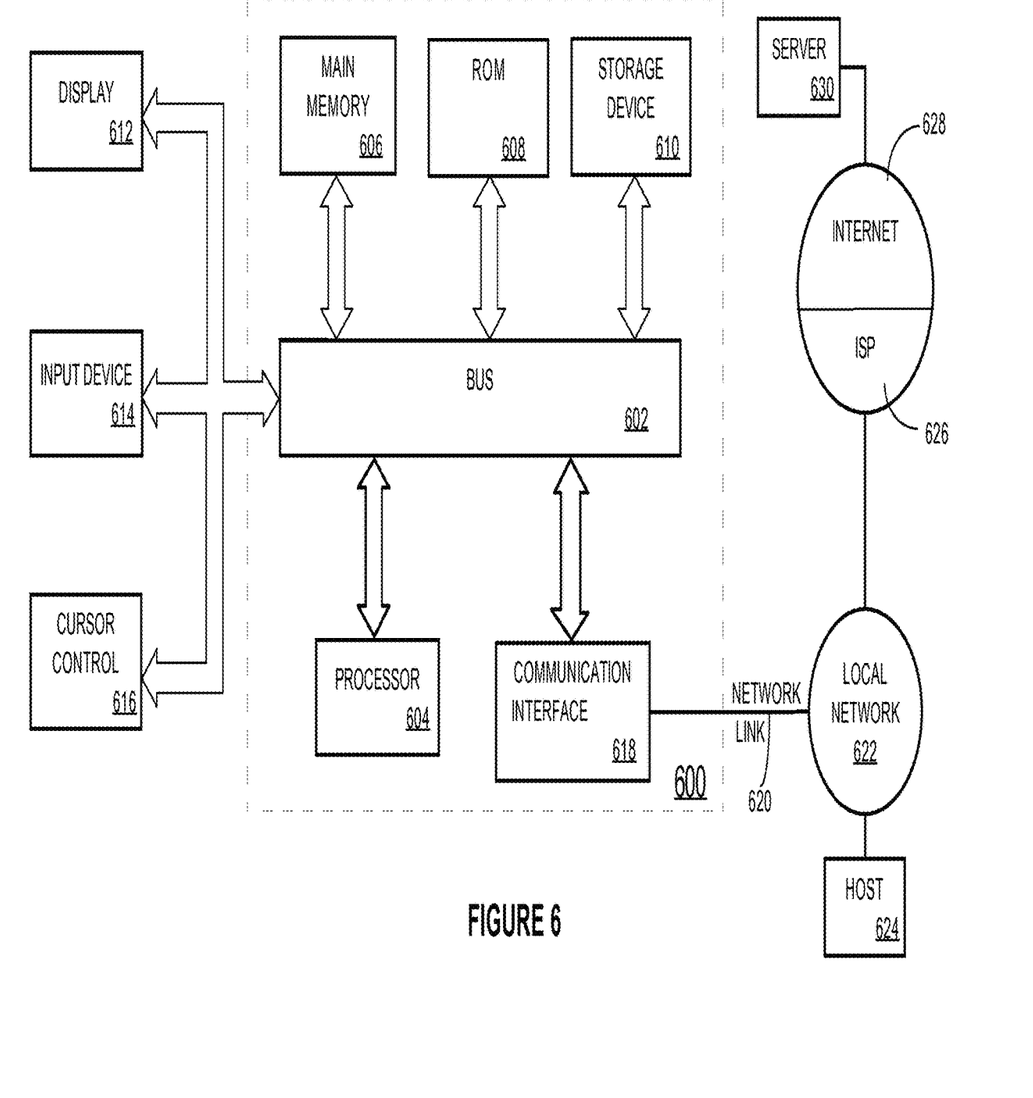
FIG. 6 shows a block diagram that illustrates a system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In an embodiment, an apparatus is a combination of one or more hardware and/or software components described herein. In an embodiment, a subsystem for performing a step is a combination of one or more hardware and/or software components that may be configured to perform the step.

8.0 EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for executing media content functions based on flick motions, the method comprising:
   generating for display media content at a first device;
   while generating for display the media content at the first device, detecting a flick motion on a touch screen interface of the first device;
   determining a direction of the flick motion;
   determining speed of the flick motion;
   selecting based on the direction of the flick motion a second device from a plurality of devices;
   determining based on the speed of the flick motion a media content function from a plurality of media content functions; and
   causing the selected second device to execute the selected media content function.

2. The method of claim 1, wherein the plurality of media content functions comprises at least one of generating for display media content, storing media content, recording media content, or trickplay functions.

3. The method of claim 2, wherein the trickplay functions comprise: pause, stop, play, forward, or rewind.

4. The method of claim 1, further comprising:
   selecting the second device from the plurality of devices based on detecting that the flick motion was in a direction of a visual representation of the second device on the touch screen interface;
   wherein during the flick motion, the flick motion is proximate to but does not touch the visual representation of the second device on the touch screen interface.

5. The method of claim 1, wherein detecting the flick motion comprises:
   detecting an initial touch on the playing media content on the touch screen interface;
   detecting a movement of the touch along the touch screen interface away from a location of the initial user touch;
   detecting a speed of the movement of the touch along the touch screen interface away from the location of the initial user touch; and
   while the movement of the touch is being detected, detecting a release of the touch.

6. The method of claim 1, wherein the flick motion comprises selection of the media content.

7. A system for executing media content functions based on flick motions, comprising:
   control circuitry configured to:
      generate for display media content at a first device;
      while generating for display the media content at the first device, detect a flick motion on a touch screen interface of the first device;
      determine a direction of the flick motion;
      determine a speed of the flick motion;
      select based on the direction of the flick motion a second device from a plurality of devices;
      determine based on the speed of the flick motion a media content function from a plurality of media content functions; and
      cause the selected second device to execute the selected media content function.

8. The system of claim 7, wherein the plurality of media content functions comprises at least one of generating for display media content, storing media content, recording media content, or trickplay functions.

9. The system of claim 8, wherein the trickplay functions comprise at least one of pause, stop, play, forward, or rewind.

10. The system of claim 7, wherein the control circuitry is further configured to:
    select the second device from the plurality of devices based on detecting that the flick motion was in a direction of a visual representation of the second device on the touch screen interface;
    wherein during the flick motion, the flick motion does not touch the visual representation of the second device on the touch screen interface.

11. The system of claim 7, wherein control circuitry is configured, when detecting the flick motion, to:
    detect an initial touch on the playing media content on the touch screen interface;
    detect a movement of the touch along the touch screen interface away from a location of the initial user touch;
    detect a speed of the movement of the touch along the touch screen interface away from the location of the initial user touch; and
    while the movement of the touch is being detected, detect a release of the touch.

12. The system of claim 7, wherein the flick motion comprises selection of the media content.

13. A non-transitory computer readable medium having instructions encoded thereon, that when executed by control circuitry causes the control circuitry to:
    generate for display media content at a first device;
    while generating for display the media content at the first device, detect a flick motion on a touch screen interface of the first device;
    determine a direction of the flick motion;
    determine a speed of the flick motion;
    select based on the direction of the flick motion a second device from a plurality of devices;

determine based on the speed of the flick motion a media content function from a plurality of media content functions; and cause the selected second device to execute the selected media content function.

14. The non-transitory computer-readable medium of claim 13, wherein the plurality of media content functions comprises any of generating for display media content, storing media content, recording media content, and trickplay functions.

15. The non-transitory computer-readable medium of claim 14, wherein the trickplay functions comprise at least one of pause, stop, play, forward, or rewind.

16. The non-transitory computer-readable medium of claim 13, wherein instructions further cause the control circuitry to:

select the second device from the plurality of devices based on detecting that the flick motion was in a direction of a visual representation of the second device on the touch screen interface;

wherein during the flick motion, the flick motion does not touch the visual representation of the second device on the touch screen interface.

17. The non-transitory computer-readable medium of claim 13, wherein the instruction for, when detecting the flick motion, causes the control circuitry to:

detect an initial touch on the playing media content on the touch screen interface;

detect a movement of the touch along the touch screen interface away from a location of the initial user touch;

detect a speed of the movement of the touch along the touch screen interface away from the location of the initial user touch; and while the movement of the touch is being detected, detect a release of the touch.

18. The non-transitory computer-readable medium of claim 13, wherein the flick motion comprises selection of the media content.

* * * * *